Figure 3:
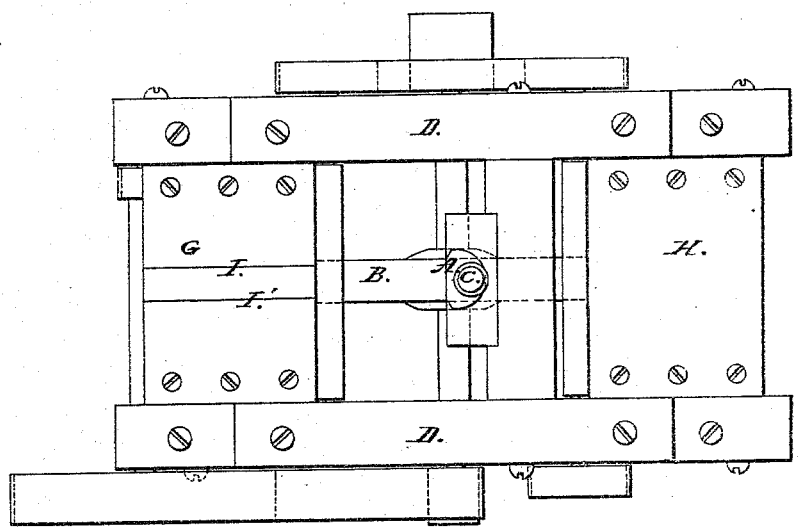

2 Sheets--Sheet 1.
D. M. MEFFORD.
Machines for Grinding Saws.
No. 137,706. Patented April 8, 1873.
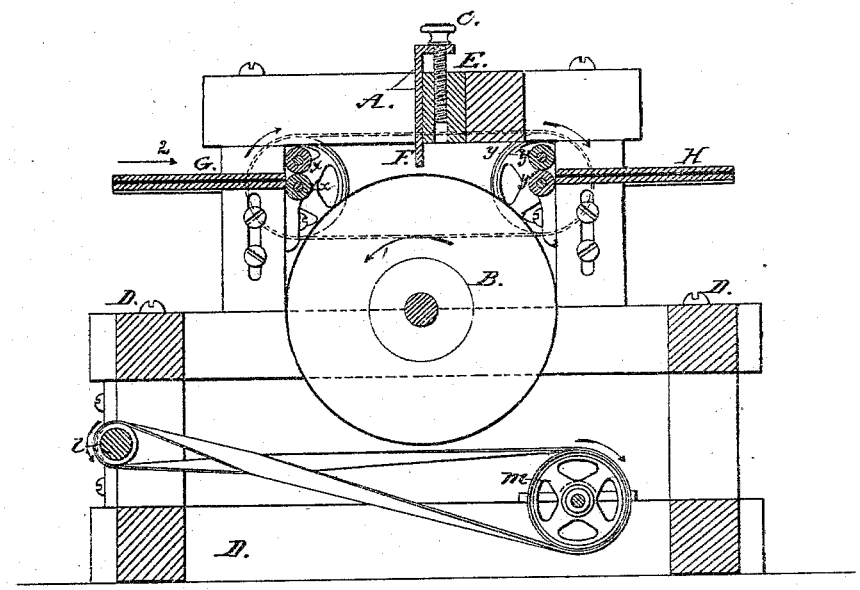
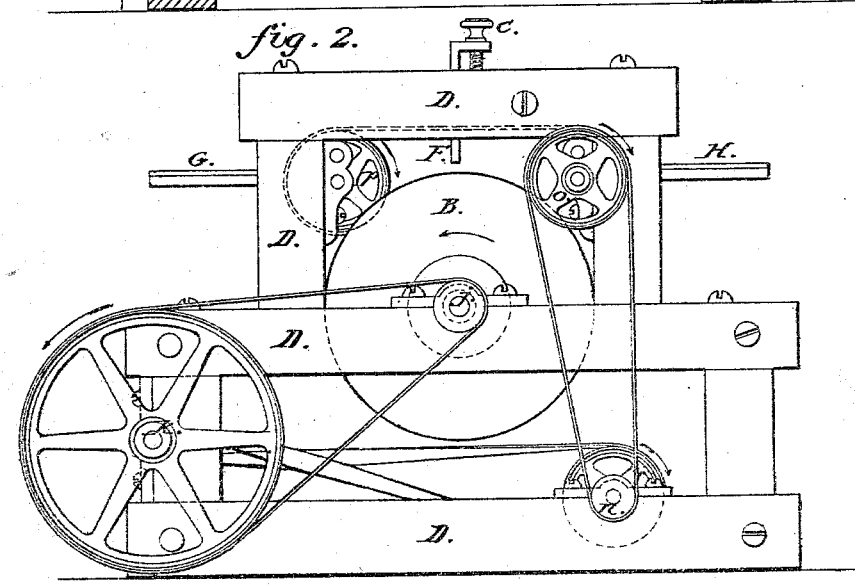
Attest:
John A. Ellis
Wm. K. Ellis
Inventor:
David M. Mefford
Per
J. H. Alexander & Co.
Attys.

2 Sheets--Sheet 2.

D. M. MEFFORD.
Machines for Grinding Saws.

No. 137,706. Patented April 8, 1873.

Attest;
John A. Ellis
Wm K. Ellis

Inventor;
David M. Mefford.
Per,
J. H. Alexander & Co.
atty's

AM. PHOTO-LITHOGRAPHIC CO. N.Y.(OSBORNE'S PROCESS.)

UNITED STATES PATENT OFFICE.

DAVID M. MEFFORD, OF NORWALK, OHIO.

IMPROVEMENT IN MACHINES FOR GRINDING SAWS.

Specification forming part of Letters Patent No. 137,706, dated April 8, 1873; application filed March 21, 1873.

*To all whom it may concern:*

Be it known that I, DAVID M. MEFFORD, of Norwalk, in the county of Huron and State of Ohio, have invented certain new and useful Improvements in Machines for Grinding Saws; and I do hereby declare that the following is a full, clear, and exact description thereof, reference being had to the accompanying drawing and to the letters of reference marked thereon which form a part of this specification.

My invention relates to improvements in machines for grinding long saws; and consists in the arrangement of the various parts, as hereinafter more fully described and pointed out by the claim.

In order to enable others skilled in the art to which my invention appertains to make and use the same, I will now proceed to describe its construction and operation, referring to the annexed drawing, in which—

Figure 1 is a longitudinal vertical section, Fig. 2 a side elevation, and Fig. 3 a plan view, of my machine.

A D represents the frame of my machine, constructed in any suitable manner to contain the various working parts. Through the center of this frame, in suitable boxes, is placed the main shaft, which carries the emery-wheel B, and which receives its motion by a belt from the power employed. This main shaft is, by a series of counter-shafts, pulleys, and belts, connected with the feed-rollers $x$ $x$ and $y$ $y$, which feed the saw over the wheel B. These pulleys and belts should be so arranged in regard to size that for every revolution of the emery-wheel B, the same being eighteen inches in diameter, the saw to be ground will be fed only from one-eighth to one-thirty-second part of an inch. G represents the feed-table, upon which the saw is laid and passed between the feed-rollers $x$ $x$ in front of the same, then over the wheel B between the rollers $y$ $y$ and out over the table H. The emery-wheel B revolves in a direction opposite to that in which the saw is fed in, as indicated by the arrows 1 and 2 in Fig. 1. Directly above the wheel in a dovetailed seat, E, is a vertical gage-bar, F, operated up and down by a set-screw, C, to hold the saw down onto the emery-wheel as it passes over the same. Generally in machines of this kind a wide grindstone running in the same direction that the saw is fed in has been used, but such machines have been found utterly impracticable for the purposes for which they were intended. The material of which the grinding-wheel was made—namely, stone—is objectionable chiefly on the ground that it will wear very fast and break and crumble. There is no guarantee even in the grinding of a single saw that the saw will be the same thickness at one end as at the other; on the contrary, it frequently happens that a saw is thinner at the end that first passes through than at the other. With an emery-wheel this will not happen, as that can be run for months without hardly any perceptible wear. Again, the broad grindstone is objectionable, because the saw will necessarily warp as it passes through the machine, and when the saw is turned over to be ground on the other side the teeth are often entirely ruined. The emery-wheel B being narrow—say, about two and a half inches against seven and a half in the old machines—only the part actually necessary to be ground absolutely true is ground by the emery-wheel, and the saw remains perfectly flat; no warping of any kind. On the feed-table are guide-lines I I to guide the saw properly. The grindstone has usually been run in the same direction that the saw is fed in. One of the many objections to this is that when, as often happens, there is a lump or thicker portion in the saw the grindstone will catch this and pull the saw along without grinding said lump, and the lump will either injure the grindstone or cause the gage above it to spring. The gage used in these old machines had a set-screw on each side of the frame, and no firm support directly above the grinding-wheel, and hence it would often often give and cause the saws to be of uneven thickness. My emery-wheel running in the opposite direction to that in which the saw is fed, when a lump or thicker portion comes in contact with the emery-wheel the motion of said wheel overcomes the motion of the feed-rollers, allowing the wheel to grind down the lump or thick portion until the same becomes of the desired thickness and can pass under the gage, when, of course, the saw will continue to be fed forward. The gage F having its set-screw C directly above the emery-wheel, it is impossible for the gage to yield or spring, and hence the saw will be of uniform thickness throughout.

It will be observed that the lower end of the gage F is made narrow, so that it covers but a limited portion of the saw widthwise, allowing only a limited portion of the width of the saw to be ground at a time, as the gage rests only upon a small portion of the saw, and the saw being supported upon the wheel by the gage alone.

The emery-wheel must be of that kind of emery-wheel that will run in water, so that the saw-plate will be kept cool. It is a well-known fact that there are but few styles of emery-wheels that will run in water, owing to the material used to put the emery on the wood.

I am aware that long saws have been ground on the top of a grinding-wheel, and having the gauge-screws located on either side of the stone; and, also, that a rest-gauge has been arranged diametrically opposite the grinding-point in a machine for grinding circular saws—the saw being supported upon one side by a mandrel—and that the grinding-wheel has been made to revolve in a direction opposite to the movement of the saw. These features I do not therefore claim; but

Having thus fully described my invention, what I claim as new, and desire to secure by Letters Patent, is—

In a machine for grinding long saws, the rest-gage F with its single set-screw C, when said gage is constructed of a width to bear only on a limited portion of the saw widthwise, and located directly over the center of the grinding-wheel B, which revolves in an opposite direction to the feed, as shown and described.

In testimony that I claim the foregoing as my own I affix my signature in presence of two witnesses.

DAVID M. MEFFORD.

Witnesses:
  WM. K. ELLIS,
  JOHN A. ELLIS.